Nov. 15, 1927.

W. R. STEUART 1,648,969

TRANSMISSION GEAR

Filed May 25, 1927     3 Sheets-Sheet 1

Inventor
William R. Steuart
by Jabel & Banning
Attys.

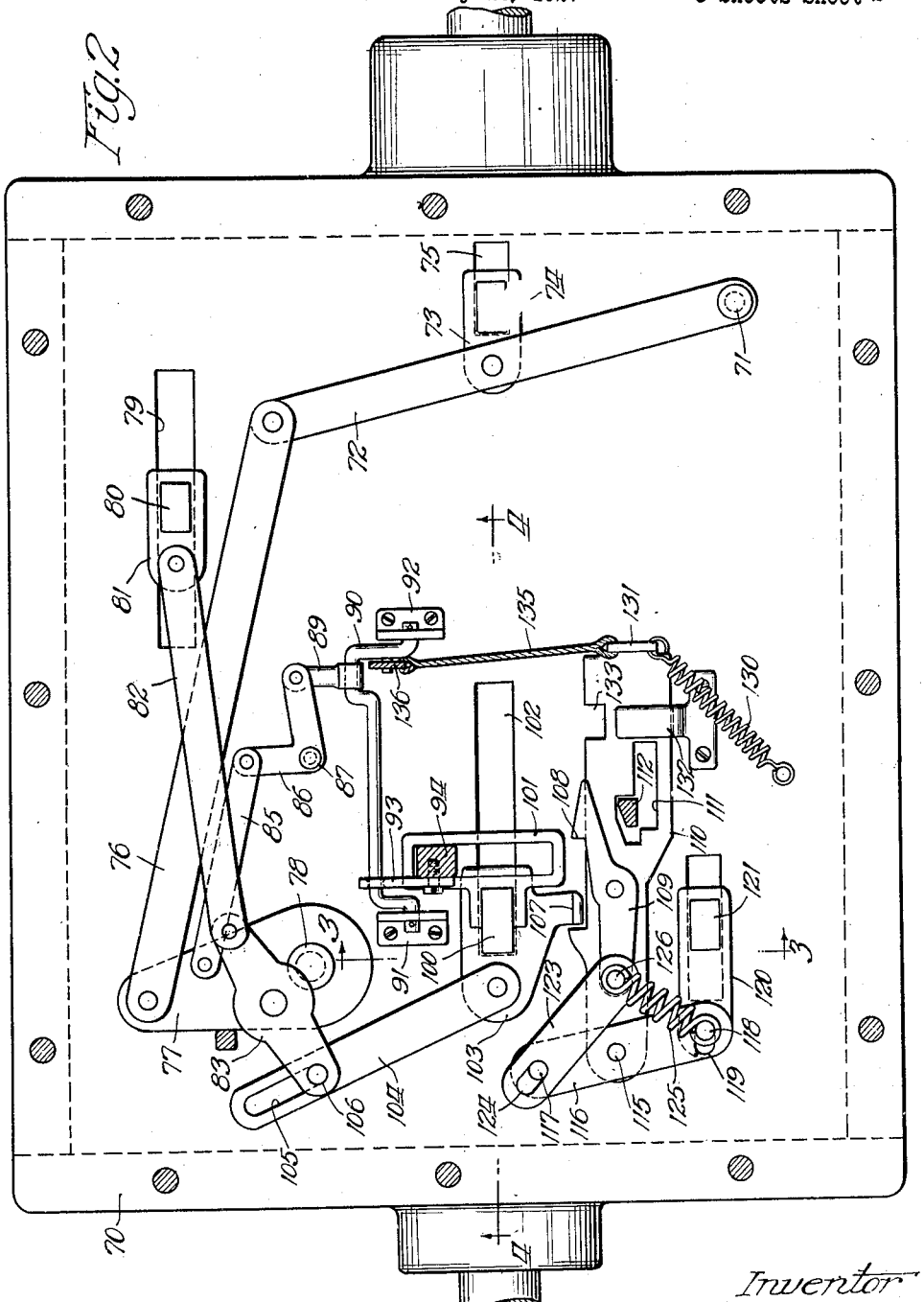

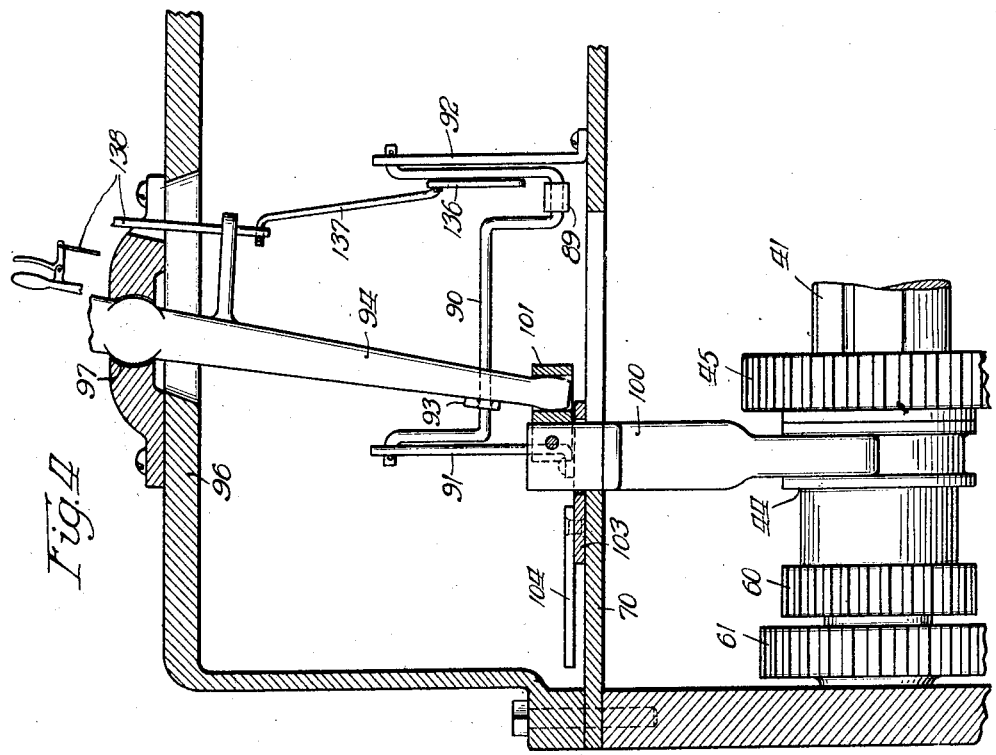
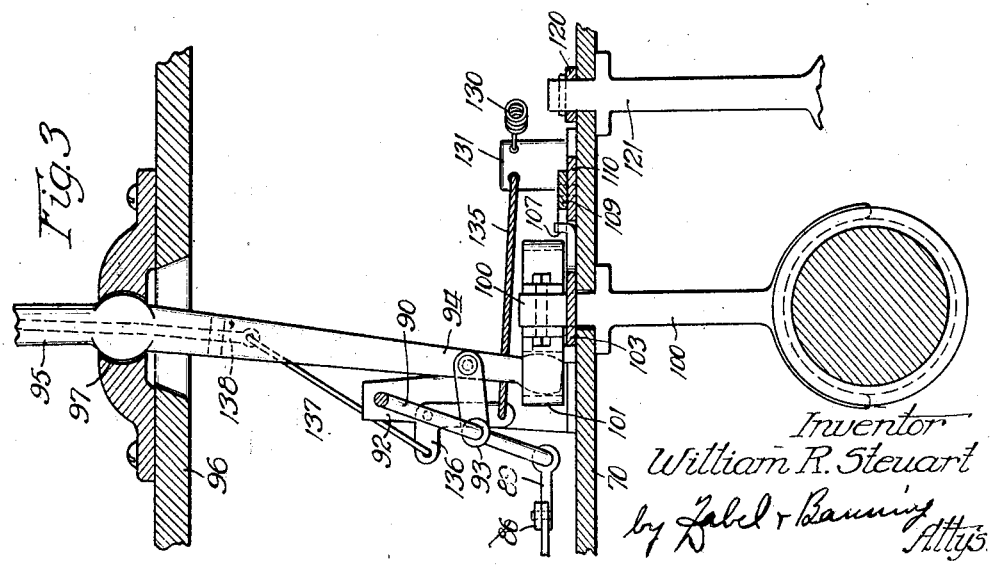

Patented Nov. 15, 1927.

1,648,969

UNITED STATES PATENT OFFICE.

WILLIAM R. STEUART, OF HARVEY, ILLINOIS.

TRANSMISSION GEAR.

Application filed May 25, 1927. Serial No. 194,066.

My invention relates to transmission gearing for transmitting power from a driving shaft to a driven shaft, and more particularly to a device of this character adapted for use on motor driven vehicles such as automobiles or trucks.

It is an object of this invention to provide a device of this character which is capable of operation through a series of positions to vary the speed of the driven shaft relative to a constant speed of the drive shaft from a relatively high speed in one direction, through a series of intermediate speeds, to a relatively high speed in the opposite direction.

Another object is to provide a device of this character wherein the change of speeds is obtained by control gearing which prevents a certain amount of the speed of the drive shaft from being transmitted to the driven shaft when the driven shaft is going at a slower speed than that of the drive shaft without subjecting the control gears to the strain or thrust occasioned by the resistance of the driven gear to rotation.

Another object of the invention is to provide a device of this character wherein the change in the speed of the driven shaft from slow speed in one direction to slow speed in the opposite direction is accomplished by a single movement of the control lever.

It is another object of the invention to provide transmission gearing of this character wherein driving and driven shafts when going at the same rate of speed are interlocked so that the gears connecting them have no relative movement with respect to either the driving or driven shaft.

A further object of the invention is to provide the transmission gearing with means whereby when the driven shaft has been caused to rotate at the same speed as the drive shaft the speed of rotation of the driven shaft may then be increased over the speed of rotation of the drive shaft, and this additional speed and the power necessary to maintain it are transmitted through gearing normally at rest during the lower speeds of the driven shaft.

It is also an object of this invention to provide a device of this character in which the connections for the driven shaft may be changed from a position giving full speed of the driven shaft to a position giving the slowest speed of the driven shaft without going through the connections for intermediate speed thereof.

Other objects and advantages of the invention will appear as the description proceeds, when taken in connection with the accompanying drawings, wherein the preferred embodiment of the invention is shown. However, it is obvious that various changes may be made from the exact details shown and described, and I intend to avail myself of all such changes as fall within the scope of the claims.

In the drawings:

Fig. 2 is a plan view showing the control means for operating the various transmission gears;

Fig. 3 is a section on the line 3—3 of Fig. 2; and

Fig. 4 is a section on the line 4—4 of Fig. 2.

Figure 1:
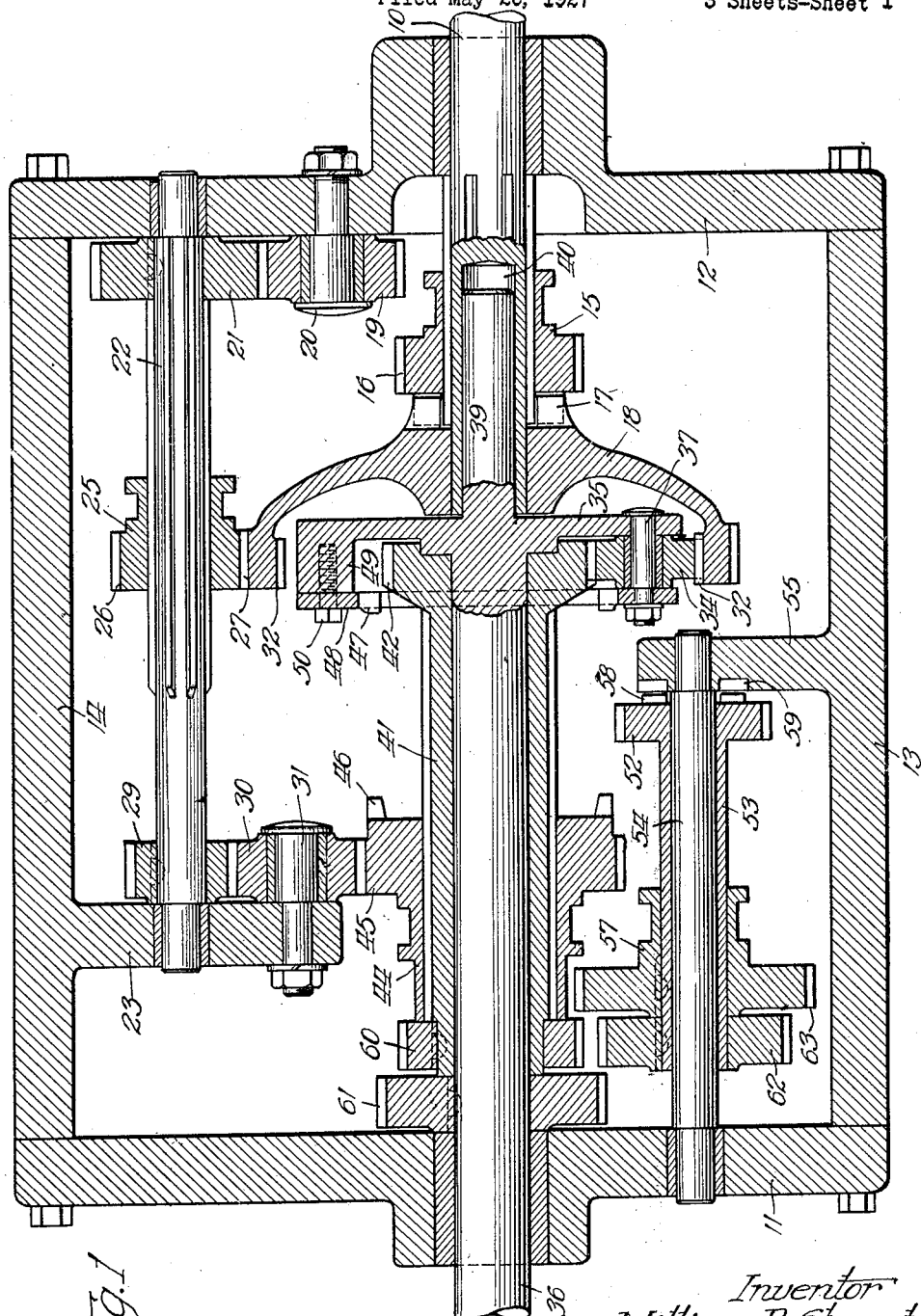
Fig. 1 is a horizontal, sectional view through the transmission gearing.

Referring now in detail to the drawings, the numeral 10 represents the drive shaft, which is connected to any suitable source of power, such as the engine of the truck, and is mounted in the frame or housing consisting of the two end members 11 and 12 connected together by any suitable means, such as the side portions 13 and 14. This drive shaft has the clutch member 15 slidably mounted thereon, the clutch member being provided with the gear 16 and the projecting lugs 17, which lugs are adapted to engage corresponding lugs on the large gear wheel 18, which, as shown, is rotatably mounted on the drive shaft 10. The clutch member 15 is shown as directly connected to the gear wheel 18, but is adapted to move rearwardly to bring the gear 16 into engagement with the gear 19 rotatably mounted by means of the pin 20 upon the frame member 12. The gear 19 in turn meshes with the gear 21 secured upon the shaft 22, which is rotatably mounted at one end in the frame member 12, and at the other end in the projecting portion 23 on the housing. The shaft 22 has the clutch member 25 splined thereon, which clutch member is provided with the gear 26 meshing in one position with the gear teeth 27 provided on the outside of the gear wheel 18. Adjacent the projection 23 the shaft 22 is provided with the gear 29, which in turn meshes with the gear 30 rotatably mounted on the projection 23 by means of the pivot pin 31. The gear wheel 18 is also provided with the internal teeth shown at 32, which engage with the teeth on the small gear 34 mounted on the annular projection 35 which forms a part of the driven shaft 36, for a purpose which will presently appear. The gear 34, as shown, is pivotally secured by means of the pin 37, and is free to rotate except for its engagement with certain gears, as will be hereinafter explained. It is obvious, of course, that any number of the gears 34 may be provided as are found necessary to give the required power transmitting strength.

The driven shaft 36, which extends outwardly through the frame member 11, is provided with the reduced end portion 39 extending into the hollow end 40 of the drive shaft, so that the driving and driven shaft are in perfect alignment.

Rotatably mounted upon the driven shaft is the elongated sleeve member 41 provided with gear teeth 42 at one end thereof, which teeth engage with the gear teeth on the gears 34. Slidably mounted upon the sleeve 41 is the clutch member 44, which, as shown, is provided with gear teeth 45 adapted in the position shown to engage with the teeth on the gear 30 and be rotated by this gear when it is being rotated by means of the gear 29 and the shaft 22. The clutch member 44 is also provided with the forwardly projecting teeth 46, which, when the clutch member is moved to the right from the position shown in Fig. 1 as far as it is possible to move it, engage in corresponding teeth recesses provided at 47 in the annular member 48, which is mounted by means of the projections 49 and securing means 50 upon the portion 35 of the drive shaft 36.

In this position it will be noted that, by means of the gear 34, the gear teeth 42 upon the sleeve 41 and the interlocking projections and recesses 46 and 47, the driven shaft is locked so as to rotate directly with the gear wheel 18, and when the gear wheel 18 is being driven directly from the shaft 10 a direct drive is established between the shaft 10 and shaft 36 with no intermediate moving gears carrying any power. This position of the gears would correspond to the standard high speed of the automobile, and in this way there is no wearing of gears so long as the car is maintained in high gear.

Now, in going from high gear to the next lower speed, the clutch member 44 is moved to the left and will engage, by means of the gear teeth 45, with the gear 52 which forms a part of the sleeve 53 rotatably mounted on the shaft 54. Shaft 54, as shown, is supported at one end in the frame member 11, and at the other end by means of the projecting lug 55 extending upwardly from the longitudinal frame portion 13. In the position shown, however, the sleeve 53 is free to rotate, so that so long as the gear teeth 45 are in mesh with the gear 52 there will be no tendency to cause a change in the rotation of the sleeve 41 other than its natural slowing down due to the action of the gears 34 in contact with the teeth 42.

Upon further movement of the clutch member 44 to the left, the gear teeth 45 are meshed with the gear 30, and the clutch member 44, together with the sleeve member 41, are rotated by means of the gear 30, gear 29, shaft 22, gear 26 and the external gear teeth 27 provided on the gear wheel 18. This rotation takes place in the opposite direction from the rotation of the gear wheel 18, and the speed of rotation of the sleeve 41 will depend upon the gear ratios between the gears 26 and 27, gears 29 and 30, and gears 30 and 45. The resultant speed transmitted to the driven shaft through the gear 34 and the member 35 will then depend upon the gear ratios, but at all events will be less than if the member 41 were standing still. These gear ratios may be suitably arranged so as to give the desired low speed corresponding to the low speed of the automobile or truck to which the gear is applied.

If it is desired to reverse the direction of the driven shaft 36, the clutch member 15 is moved to the right, as shown in Fig. 1, until the gear 16 meshes with the gear 19, whereupon shaft 22 will be rotated from the drive shaft 10 by means of gears 16, 19 and 21. These in turn will rotate gear 26 and cause rotation of the gear wheel 18 in the direction opposite to that of the shaft 10. At the same time, gears 29, 30 and 45 will cause rotation of the clutch member 44, and with it the sleeve 41, in the same direction as the shaft 10, but owing to the relative size of the gears and the interposition of the gear 34, the forward rotation of the member 41 is not sufficient to prevent entirely rotation of the member 35 and driven shaft 36 by means of gear wheel 18, so that low speed in reverse direction is obtained for the shaft 36. The clutch 44 then may be moved to the right into engagement with the gear 52, which at this time, by means of suitable mechanism to be hereinafter described and the clutch 57, is moved to the right, so that the projections 58 on gear 52 engage in the recesses 59 provided in the projection 55 and prevent rotation of the gear 52. In this intermediate position, therefore, clutch 44 and sleeve 41 are held stationary, and, due to the gears 34, the member 35 and shaft 36 are rotated at a higher speed of rotation in reverse direction, but not at full reverse speed. Clutch 44 may then be moved to its extreme right position, where the teeth 46 thereon engage recesses 47 to directly lock member 41 and gear 34 to the portion 35 and gear wheel 18 so as to cause a direct drive in reverse direction from shaft 10 through gears 16, 19 and 21, shaft 22 and gears 26 and 27, to the shaft 36, which gives the maximum speed in reverse direction.

It is sometimes desirable, upon smooth roads or down grades, to be able to slow down the engine and still maintain a relatively high speed, and in this manner save fuel, as well as wear upon the engine, due to the excessive speed at which it is operating. In order to provide for an increase in speed of the driven shaft above that of the drive shaft, I have provided means whereby, when the driving and driven shafts have been locked together, the driver may by moving the clutch member 44 to the left, and at the same time moving the clutch member 57 to the left, get a higher speed on shaft 36 than that upon the shaft 10.

This is accomplished by means of the gears 60 and 61, secured, respectively, to the sleeve 41 and the driven shaft 36, the gear 61 being the larger, together with gears 62 and 63, both of which are rigidly secured to the sleeve 53 and rotate therewith. Now when clutch 44 is moved from the extreme right-hand position outwardly, and gear 52 together with the clutch 57 are moved to the left to bring gears 61 and 62 in mesh and gears 60 and 63 in mesh, the member 41 will be rotated forwardly at a higher rate of speed than that of either the driving or driven shaft. This will in turn cause an additional higher speed of the driven shaft, due to the gear 34 and the member 35, so that the resultant speed of shaft 36 is above that of the shaft 10, and the high speed of the car may be maintained, while the engine is permitted to slow down. At this time gear 52 does not mesh with the gear teeth 45 because, as hereinbefore stated, it is moved to the left by means of the clutch 57 a sufficient distance to avoid meshing with the teeth 45.

The above description, it is thought, will make the operation of the gears and the transmission of power at the different speeds clear to one skilled in this art, and the means for operating the various clutches from the shift lever will now be described.

In Fig. 2 there is provided the plate 70, which covers the gear mechanism shown in Fig. 1, and upon this plate is mounted the mechanism for controlling the various clutches. Pivoted at 71 is the lever arm 72, which intermediate its ends has the plate 73 engaging the top of a clutch collar 74, which extends through the slot 75 in the plate 70 and is adapted to engage the clutch 15 for moving the same to right or left in a manner which will presently appear. The arm 72 is connected by means of the link 76 to the pivoted member 77 pivoted at 78 to the plate 70. Directly above the clutch member 25 there is also provided a slot 79 through which the clutch collar for this clutch member, indicated by the numeral 80, projects, and this clutch collar is moved along the slot 79 by means of the plate 81 and the link 82, which is in turn connected to the member 83 pivoted at its center upon the member 77. The member 77 is connected by the link 85 to the bell crank 86 pivoted at 87 to the plate 70, and connected by means of the link 89 to the crank arm 90, which, as shown in Fig. 4, is mounted on a pair of upstanding supports 91 and 92. The member 90 is connected by means of the link 93, which is slidable longitudinally thereof, to the lower end 94 of the shift lever 95, which is mounted in a ball socket in the floor of the car 96, as illustrated at 97 in Figs. 3 and 4. Thus the rocking motion of the shift lever 95 to right or left, as shown in Fig. 3, will cause a resultant rocking of the member 77, and with it movement of the clutch collars 74 and 80 to bring the clutches connected therewith into or out of engagement with their respective gears.

The clutch 44 is operated from the shift lever by means of the upwardly extending clutch collar 100 having the slotted member 101 secured at the upper end thereof to receive the lower end 94 of the shift lever, the plate 70 being slotted as shown at 102 to permit longitudinal movement of the clutch collar 100. There is also secured to the stem of the clutch collar 100 a plate 103 which is connected by means of a link 104 having the slot 105 in its end to the free end 106 of the member 83, the purpose of this connection being that when the clutch member 44 is moved to the extreme right-hand position, as shown in Fig. 1, so that the stem of the clutch collar 100 is at the extreme right end of the slot 102, as shown in Fig. 2, the clutch collar 80 will maintain the clutch 25 moved to the left so as to mesh gears 26 and 27 even though the pivoted member 77 is moved, by means of the bell crank 86 and its connections to the shift lever 94, to a position to release clutch 15 from gear wheel 18 and cause its gear 16 to mesh with gear 19.

The plate 103 has a further function in controlling, by means of interlocking mechanism presently to be described, the actuation of the clutch 57 to move the sleeve 53 to the right or the left for the intermediate speed position. As shown, the plate 103 is provided with a projection 107, which is adapted to engage, as the plate 103 moves to the right, with the projection 108 on the pivoted member 109 pivoted to the plate 110, which is slidable within limits defined by the slot 111 therein and the stop 112 longitudinally and transversely with respect to the plate 70. This plate 110 is pivoted at 115 to an arm 116 which is pivoted to the plate 70 by the pivoted member 117, the arm 116 being extended and connecting by means of the pivot 118 and slot 119 to the slide 120, which connects to the clutch collar stem 121 for moving the clutch 57.

From the above description it will be seen that sliding the member 110 to right or left will cause movement, with the exception of the lost motion due to the slot 119, of the slide 120 and the clutch collar carried thereby.

The pivoted member 109 is connected by means of the link 123 to the pivot point 117, and the link 123 is slotted as at 124, to provide a certain amount of lost motion.

In order to have a tendency to maintain the projection 108 in the path of the projection 107, the spring 125 is connected at 126 to the coupling between members 109 and 123, and is connected at its other end to the pivot 118. As the slide 103 is moved to the right, as shown in Fig. 2. it will engage the projection 108 and move the slide 110 a certain amount to the right, which will in turn cause the link 116 to move the slide 120 and its clutch collar, together with the clutch 57, to the right, to bring the projections 58 into the slots 59 and lock the sleeve 53 against rotation. Now, as the member 103 is moved further to the right, the lost motion due to the slot 124 and link 123 is all taken up, and further movement of the slide 116 will cause the link 123 and member 109 to move upwardly at their junction point, and thus throw the projection 108 out of the path of the projection 107. These projections may also be rounded to aid in passing each other to permit the member 103 to move further to the right and bring clutch member 44 to its extreme right-hand position, in which position the projection 107 has passed projection 108, so that the slide 110 is again released and can move to the left, carrying with it the clutch 57 and sleeve 53 to again permit rotation of this sleeve if it is so desired.

In order to hold the slide 110 normally in the left-hand position, I provide the spring 130, which is secured at one end upon the plate 70 and at the other end to the projection 131 on the end of the slide 110. This holds the slide in left-hand position and also tends to maintain it back against the stop and guide member 132 secured upon the plate 70.

Now, when it is desired to utilize the extra high speed which has been hereinbefore described, the clutch 57 must be moved to the left through a considerable distance. The stop 112 and the slot 111 prevent movement of the slide 110 to the left a distance sufficient to accomplish this connection unless the slide 110 is moved a sufficient distance to permit the stop 112 to fit into the elongated portion of the slot 111. Again, in order to accomplish this action, the stop 107 must engage in the recess 133 provided adjacent the right-hand end of the slide 110. In order to move the slide out, I connect the right-hand end thereof, by means of the projection 131 and flexible connector 135, to a bell crank 136 pivoted, as shown in Fig. 3, to the crank arm 90, and connect the other end of this bell crank by means of the link 137 to the sliding rod 138, which is connected at its upper end by any suitable lever means to the shift lever, whereby it may be lifted to pull the flexible member 135 by means of the crank arm 36, and thus move slide 110 outwardly to engage the projection 107 with the slot 133, whereupon movement of the slide 103 to the left will carry with it the projection 110, and this in turn will cause movement through the link 116 and its connection to the clutch 57, of this clutch and the gears 62 and 63 affixed thereto to the left, into engagement with gears 60 and 61.

It is then necessary, of course, in going back to normal speed, to again move the slide 103 to the extreme right position, and release lever 138 to permit the slide 110 to resume its normal position, whereupon the usual operation of the shift lever may be utilized to change from high speed to low speed and reverse or intermediate speeds as desired.

It is thought that from the above description the operation of this device will be clear to those skilled in this art.

Having thus described my invention, what I claim and desire to secure by Letters Patent of the United States is:

1. Means for transmitting power from a driving member to a driven member comprising a primary member adapted to be driven by said driving member at a speed proportional thereto, a secondary member, means on said driven member responsive to the speeds of rotation of both said primary member and said secondary member and means for changing the speed of said secondary member from rotation in the opposite direction to that of the primary member to zero speed and from zero speed to rotation in the same direction and at the same speed as that of the primary member, said last named means including mechanism positively locking said secondary member against rotation when at zero speed.

2. Power transmission means comprising a drive shaft, a driven shaft, a gear wheel on said drive shaft having internal gear teeth thereon, a projecting member on said driven shaft having a gear rotatably mounted thereon at a distance from said driven shaft, said gear meshing with the internal gear teeth on said wheel, a member rotatably mounted on said driven shaft and having gear teeth thereon meshing with said gear, means driven from said drive shaft for rotating said member in a direction opposite the direction of rotation of said gear wheel, and means for disconnecting said member from its rotating means and locking said member against rotation.

3. Power transmission means comprising a drive shaft, a driven shaft, a gear wheel on said drive shaft having internal gear teeth thereon, a projecting member on said driven shaft having a gear rotatably mounted thereon at a distance from said driven shaft, said gear meshing with the internal gear teeth on said wheel, a member rotatably mounted on said driven shaft and having gear teeth thereon meshing with said gear, a connecting device slidably and non-rotatably mounted on said member, means driven from said drive shaft engaging said connecting device for rotating said member in a direction opposite that of the gear wheel in one position of said device, means engaging said device in a second position thereof to hold said member stationary, and means for non-rotatably connecting said device to said projecting member in a third position of said device.

4. Power transmission means comprising a drive shaft, a driven shaft, a gear wheel on said drive shaft having internal gear teeth thereon, a projecting member on said driven shaft having a gear rotatably mounted thereon at a distance from said driven shaft, said gear meshing with the internal gear teeth on said wheel, a member rotatably mounted on said driven shaft and having gear teeth thereon meshing with said gear, a connecting device slidably and non-rotatably mounted on said member, means driven from said drive shaft engaging said connecting device for rotating said member in a direction opposite that of the gear wheel in one position of said device, means engaging said device in a second position thereof to hold said member stationary, and means including said projecting member and the gear thereon for causing said driven shaft to rotate directly with said gear wheel when said device is moved to a third position.

5. Power transmission means comprising a drive shaft, a driven shaft, clutch and gear mechanism connecting said shafts, said clutch and gear mechanism being shiftable through a plurality of positions to cause said driven shaft to be driven at a plurality of different speeds in opposite directions for a single speed of said drive shaft in one direction, a shift lever, and connections between said shift lever and said clutch and gear mechanism whereby a single movement of said shift lever in one direction will cause said driven shaft to change from the lowest speed in one direction to lowest speed in the opposite direction.

6. Power transmission means comprising a drive shaft, a driven shaft, a gear wheel on said drive shaft having internal gear teeth thereon, a projecting member on said driven shaft having a gear rotatably mounted thereon at a distance from said driven shaft, said gear meshing with the internal gear teeth on said wheel, a member rotatably mounted on said driven shaft and having gear teeth thereon meshing with said gear, a connecting device slidably and non-rotatably mounted on said member, means driven from said drive shaft engaging said connecting device for rotating said member in a direction opposite that of the gear wheel in one position of said device, means engaging said device in a second position thereof to hold said member stationary, means for non-rotatably connecting said device to said projecting member in a third position of said device, and means connecting with said device in a fourth position thereof to rotate said member in the same direction as said gear wheel and at a greater speed.

7. Power transmission means comprising a drive shaft, a driven shaft, clutch and gear mechanism connecting said shafts, said clutch and gear mechanism being shiftable through a plurality of positions to cause said driven shaft to be driven at a plurality of different speeds in opposite directions for a single speed of said drive shaft in one direction, a shift lever, and connections between said shift lever and said clutch and gear mechanism whereby a single movement of said shift lever in one direction will cause said driven shaft to change from the lowest speed in one direction to lowest speed in the opposite direction, and a single movement of the shift lever in a second direction at an angle to the plane of the first movement will cause said driven shaft to change from one speed to another in the same direction.

In witness whereof, I hereunto subscribe my name this 3rd day of May, A. D. 1927.

WILLIAM R. STEUART.